United States Patent [19]
Malik

[11] Patent Number: 5,903,636
[45] Date of Patent: May 11, 1999

[54] SYSTEM AND METHOD FOR PROVIDING CALLER IDENTIFICATION IN CONJUNCTION WITH CALLING CARD CALLS

[75] Inventor: Dale W. Malik, Atlanta, Ga.

[73] Assignee: BellSouth Corporation, Atlanta, Ga.

[21] Appl. No.: 08/957,832

[22] Filed: Oct. 27, 1997

[51] Int. Cl.⁶ ...................................................... H04M 3/42
[52] U.S. Cl. ........................... 379/142; 379/207; 379/245
[58] Field of Search ..................................... 379/142, 127, 379/201, 207, 245, 246

[56] References Cited

U.S. PATENT DOCUMENTS

| | | | |
|---|---|---|---|
| 4,277,649 | 7/1981 | Sheinbein | 179/18 B |
| 4,769,834 | 9/1988 | Billinger et al. | 379/112 |
| 5,276,731 | 1/1994 | Arbel et al. | 379/88 |
| 5,278,894 | 1/1994 | Shaw | 379/142 |
| 5,283,824 | 2/1994 | Shaw | 379/142 |
| 5,289,542 | 2/1994 | Kessler | 379/142 |
| 5,590,184 | 12/1996 | London | 379/142 |
| 5,787,444 | 7/1998 | Snyder et al. | 379/142 |

*Primary Examiner*—Paul Loomis
*Attorney, Agent, or Firm*—Jones & Askew, LLP

[57] ABSTRACT

A system and method for providing calling party identification information to a called party in an intelligent network. A long distance calling card company maintains a subscriber database that includes preferred calling number data and calling name data for each subscriber. When a subscriber places a calling card call, the service provider looks up the subscriber's database record, retrieves the preferred calling number data, and sends the calling number data to the terminating end office. A calling name query from the terminating end office is routed to a database that includes data from the service provider's subscriber database. The caller's name is retrieved and returned to the terminating end office and displayed on the called party's display device, along with the calling number data, date, and time. By directing the calling name inquiry to the service provider's subscriber database, or to a database that includes relevant data from the subscriber database, the called party's caller ID display device is able to display both the calling party's identity and a valid call back number.

19 Claims, 4 Drawing Sheets

SYSTEM AND METHOD FOR PROVIDING CALLER IDENTIFICATION IN CONJUNCTION WITH CALLING CARD CALLS

TECHNICAL FIELD

The present invention relates to the provision of calling party identification data in telecommunications systems, and more particularly relates to a system and method for providing calling party identification data in conjunction with calling card calls.

BACKGROUND OF THE INVENTION

Many local telephone companies provide calling line identification services, such as those marketed as Caller ID and Caller ID-Deluxe. When a subscriber receives a telephone call, these services allow the subscriber to view on a display device the phone number from which the call originated and, in some cases, the name of the person making the call. These services are increasingly popular because, in many cases, they allow the called party to know both the identity of the calling party and the telephone number at which the calling party may be reached.

Current calling line identification services work best when the calling party is a residential subscriber calling from his or her residential telephone. In other cases, some of the displayed information may be missing or erroneous. For example, when a subscriber receives a call from a pay phone, the originating number will be displayed, but the calling party will not be identified. In the case of calls from some businesses, the displayed number will identify the directory number associated with an outgoing trunk line instead of the inbound telephone number the business uses to receive telephone calls. Callers who prefer to be called back on an 800 number face similar problems because 800 numbers are "fictitious" numbers that are translated to the directory numbers that are actually used to route the call. Although an 800 number is the proper call back number, it will not be displayed because the call did not originate from a subscriber line having that number.

In order to understand the drawbacks associated with current calling line identification services, it is helpful to understand how the services are provided. Basic Caller ID displays only the originating phone number. In order to accomplish this, the calling number is captured by the originating end office and sent to the terminating end office in an Initial Address Message, which is part of the call setup protocol. The terminating end office sends the calling number over the subscriber's line to the display device after the first ringing signal. The calling number is also referred to as the Incoming Calling Line Identification (ICLID) number.

Caller ID-Deluxe, which is also referred to as calling name delivery service, requires additional features available in an intelligent telecommunications network. Like the basic Caller ID scenario described above, the calling number is captured by the originating end office and sent to the terminating end office in an Initial Address Message. At that point, the terminating end office recognizes that the call is for a Caller ID-Deluxe subscriber and launches a calling name query on the intelligent network. The query message includes the calling number in the message's called party address field. A signaling transfer point (STP) performs a global title translation on the called party address to determine which service control point (SCP) to route the query to, and forwards the query to that SCP. The SCP searches the name database, which is built from the local phone company's billing records, for the calling number record and retrieves the associated name. The SCP returns the caller name to the terminating end office in a TCAP response. When the terminating office completes the call to the subscriber's phone, it sends the caller name and calling number, along with the current date and time, over the subscriber's line to the display device.

From the foregoing, it is apparent that in order for called party to know both the identity of the calling party and the telephone number at which the calling party may be reached, two things must happen. First, the calling number data received by the terminating end office must be the correct call back number. Second, the calling name database that is queried as a result of the terminating end office's calling name query must be able to match the caller's name with the calling number that was received at the terminating end office.

AT&T has addressed some of the drawbacks that relate to the provision of caller identification services in the context of credit card calls. U.S. Pat. No. 5,283,824 to Shaw describes a system in which the caller can specify the number that is sent to the terminating end office as the calling number. The system allows the caller to specify that the transmitted calling number data include the calling card number, which may include the customer's home or business number, the calling station number, or a personal identification number.

In the described system, the customer places a calling card call. The calling card system prompts the customer to enter the calling card number and to select the calling card number, calling telephone number, or personal identification number as the calling number data. The customer then dials the called party's phone number and the system sends the selected number to the terminating end office. At that point, the terminating end office launches a calling name query using the provided calling number.

If the user instructs the AT&T system to send a telephone number at which he or she may be called back (e.g., an office or hotel number, personal number, 800 number, wireless phone number, etc.), the Caller ID display device will not display the caller's name. If the user instructs the system to send his or her home telephone number, the display device will display the identity of the calling party (along with his or her home telephone number), but will not display the telephone number at which the calling party may actually be reached. Although the described system allows the user to send a meaningful number as the calling number, the calling party must determine whether the display device will display the proper call back number or properly identify the calling party.

In prior art caller identification systems, it is apparent that the only way to ensure that the displayed data properly identifies the calling party and provides a useful call back number is for the caller to place the call from a phone that is billed to him. This results in large part because the calling name databases are compiled from the local phone company's billing records.

Therefore, there is a need in the art for an improved system and method for providing calling party identification data, which will allow a calling party to ensure that the called party's display device displays both the calling party's proper identity and a valid call back number in situations where the calling party is not calling from a phone that is billed to him.

SUMMARY OF THE INVENTION

The present invention satisfies the above-described needs by providing an improved system and method for providing calling party identification information to a called party in an intelligent network. A service provider maintains at least one subscriber database that includes preferred calling number data and calling name data for each subscriber. When a subscriber places a call, the service provider looks up the subscriber's database record and sends the calling number data to the terminating end office. When the terminating end office launches a calling name inquiry, the inquiry will be directed to a database that includes the data from the service provider's subscriber database. The caller's name is returned to the terminating end office and displayed on the called party's display device, along with the calling number data, date, and time.

Generally described, the present invention provides a method for providing calling party identification information to a called party in a telecommunications network. The method includes receiving a first query, which includes a subscriber number, from a first switch. A calling line identification number associated with the subscriber number is retrieved in response to the first query and transmitted to the first switch. A second query, including the calling line identification number, is received from a second switch. Calling party identification information associated with the calling line identification number is retrieved in response to the second query and transmitted to the second switch.

More particularly described, the calling party identification information associated with the calling line identification number is retrieved by first retrieving calling name data associated with the calling line identification number and determining whether the calling name data includes a special character. If the calling name data includes a special character, calling party identification information, which is associated with a key that forms a part of the calling name data, is retrieved. Still more particularly, the calling name data and the calling party identification information may be retrieved from first and second databases, respectively, with the calling name data including a database identifier that links the calling name data to the second database.

In another aspect, the present invention provides a data structure that allows calling party information associated with a calling party to be displayed on a display device associated with a called party. The data structure includes a linked record and a standard record. The linked record includes a first field, which includes a calling line identification number associated with the calling party, and a second field, which includes a special character and a key. The standard record includes a first field, which includes a calling line identification number corresponding to the key, and a second field, which includes calling name data associated with the calling party. Together, these features of the database structure allow a telecommunications network to provide to the display device both the calling line identification number associated with the calling party and the calling name data associated with the calling party.

The various aspects of the present invention may be more clearly understood and appreciated from a review of the following detailed description of the disclosed embodiments and by reference to the appended drawings and claims.

DETAILED DESCRIPTION

Figure 1:
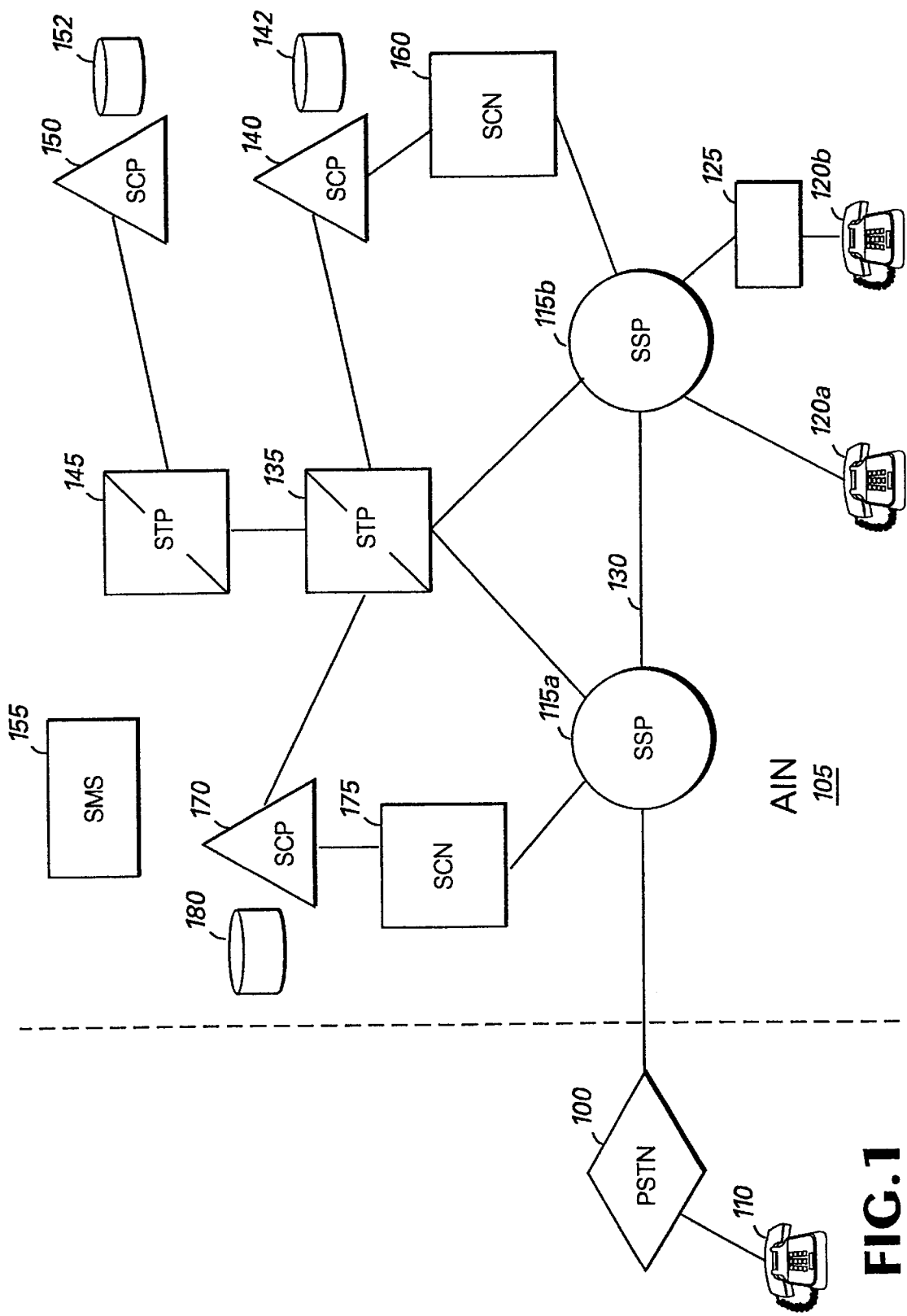
FIG. 1 is a diagram of an exemplary embodiment and an exemplary environment for operation of the present invention.

The present invention is directed to an improved system and method for providing calling party identification information to a called party in an intelligent network. In an exemplary embodiment, a telecommunications service provider, such as a long distance calling card company, maintains a subscriber database that includes preferred calling number data and calling name data for each subscriber. When a subscriber places a call, the service provider looks up the subscriber's database record and sends the calling number data to the terminating end office. When the terminating end office launches a calling name inquiry, the inquiry will be directed to a database that includes the data from the service provider's subscriber database. The caller's name is returned to the terminating end office and displayed on the called party's display device, along with the calling number data, date, and time. By directing the calling name inquiry to the service provider's subscriber database, or to a database that includes relevant data from the subscriber database, the called party's caller ID display device is able to display both the calling party's identity and a valid call back number.

The present invention is particularly advantageous when used with to display a calling party's "portable" call back number. In the context of this discussion, portable numbers include so-called personal numbers, which route incoming calls to a list of directory numbers identified by the subscriber. This allows a user to give out a single telephone number and have the calls to that number routed to his or her home, office, cellular phone, etc. The term portable number also includes directory numbers associated with portable devices, such as wireless (e.g., cellular and PCS) telephones and pagers. Those skilled in the art will appreciate that portable numbers allow users to receive incoming telephone calls regardless of their geographic location.

Referring now to the drawings, in which like numerals represent like elements throughout the several figures, an embodiment of the present invention and an exemplary operating environment will be described. The particular embodiments described herein are intended in all respects to be illustrative rather than restrictive. Alternative embodiments will become apparent to those skilled in the art to which the present invention pertains without departing from its spirit and scope.

Exemplary Operating Environment

FIG. 1 and the following discussion are intended to provide a description of an exemplary embodiment of the present invention as it may be provisioned in an exemplary telecommunications network environment. FIG. 1 is a diagram of an exemplary embodiment and exemplary environment for operation of the present invention. Connected to the public switched telephone network (PSTN) 100 is an Advanced Intelligent Network (AIN) 105. For brevity, only a basic explanation of the AIN 105 is provided herein. Where the AIN 105 operates or is composed differently in an important aspect from that which would be understood by those skilled in the art, additional details are provided herein. For further information regarding the referenced AIN 105 and aspects thereof, the interested reader may refer to the patent to U.S. Pat. No. 5,430,719, to Weisser, which is incorporated herein by reference.

A telephone 110 represents terminating equipment connected to the PSTN 100. Those skilled in the art will appreciate that the AIN 105 is operated by a local exchange carrier, such as the assignee of the present invention, and that the PSTN 100 represents various networks belong to other entities. For purposes of the present invention, the PSTN represent telecommunications networks operated by other local exchange carriers in the United States and various telephone companies around the world. Similarly, in the exemplary embodiment of FIG. 1, the local exchange carrier that operates the AIN 105 also provides long distance calling card services to subscribers.

The AIN 105 includes a variety of interconnected network elements. A group of such network elements includes the plurality of central offices, which are indicated as service switching points (SSPs) 115a, 115b. An SSP typically includes switch functionality, but also includes other functionality so as to communicate with other AIN elements as those skilled in the art understand. The SSP 115b has a plurality of subscriber lines connected thereto. A subscriber line may also be referred to as a calling line. Each SSP serves a designated group of calling lines, and thus, the SSP that serves a particular calling line may be referred to as its serving SSP. Each calling line is connected typically to a piece of terminating equipment including a plurality of telephones commonly referenced as 120 and individually referenced as 120a and 120b. Although telephones are illustrated as the pieces of terminating equipment in FIG. 1, those skilled in the art will understand that such pieces include other telecommunication devices such as facsimile machines, computers, modems, etc. The telephone 120b is also connected to a caller ID display device 125, which is capable of displaying the calling number and the calling party's name when a call is received.

In an exemplary embodiment, each active calling line in an AIN is assigned a ten digit calling line number. In the description of the present invention, the term "calling line number" is used in its generally understood meaning to be the number that is dialed or input by a caller or source to reach a piece of terminating equipment on a calling line associated with the dialed calling line number. A calling line number is commonly referred to as a telephone number or a directory number.

SSPs 115a, 115b are interconnected by one or more trunk circuits 130. These are the voice path trunks that interconnect the SSPs to connect communications. The term "communication" or "call" is used herein to include all messages that may be exchanged between caller and called party in the network illustrated in FIG. 1.

Each of the SSPs 115a, 115b is connected to another type of AIN element referred to as a local signal transfer point (STP) 135 via respective data links. Currently, these are data links employing a signaling protocol referred to as Signaling System 7 (SS7), which is well known to those skilled in the art. Much of the intelligence of the AIN resides in yet another type of AIN element referred to as a local service control point (SCP) 140 that is connected to STP 135 over a SS7 data link. Among the functions performed by the SCP 140 is the maintenance of network databases and subscriber databases referred to collectively as local SCP databases 142. These databases may be used in providing advanced telecommunication services to a customer. Typically, the SCP 140 is also the repository of service package applications (SPAs) that are used in connection with or as part of the databases in the application of advanced telecommunication services or enhanced features to calling lines.

As used herein, the phrase "advanced telecommunication services" refers to features or enhancements that are provided by a telecommunications service provider to a customer in addition to conventional telephone service through the PSTN.

Referring again to FIG. 1, the local SCP 135 may be connected to other network elements through a regional STP 145, which in turn, may be connected to a regional SCP 150. The regional SCP 150 may maintain one or more regional SCP databases 152. Both regional SCP 150 and local SCP 140 are connected to a service management system (SMS) 155 via respective data links (not shown). The SMS 155 interfaces to other operation systems of the local exchange carrier and interexchange carriers.

In order to keep the processing of data and calls as simple as possible, a relatively small set of triggers is defined at the SSPs for each call. A trigger in the AIN is an event associated with a particular call that generates a packet to be sent to an SCP. The trigger causes the SCP to query its databases or service package applications for processing instructions with respect to the particular call. The results are sent back to the SSP in a response from the SCP 140 through STP 135. The return packet includes instructions to the SSP as to how to process the call. The instructions may be to take some special action as a result of a customized calling service or enhanced feature. In response, the SSP moves through its call states, collects the called digits, and generates additional packets that are used to set up and route the call. Similar devices for routing calls among various local exchange carriers are provided by regional STP 145 and regional SCP 150.

As illustrated in FIG. 1, the AIN 105 also includes a service circuit node 160 (SCN), which may also be referred to herein as a service node (SN). SCN 160 includes voice and dual tone multi-frequency (DTMF) signal recognition devices and voice synthesis devices. SCN 160 is connected to the local SCP 140 via data link 165 using an X.25 protocol and to the SMS 155 via a data link (not shown). In addition, SCN 160 typically is connected to one or more (but usually only a few) SSPs via Integrated Service Digital Network (ISDN) links as shown by the connection to SSP 115b.

Exemplary Provisioning of the Present Invention

With continuing reference to FIG. 1, an exemplary approach to provisioning the present invention will be described. In an exemplary embodiment, the present invention is employed by a telecommunications company to provide caller identification services to those who subscribe to its calling card service. These services will permit the recipient of a calling card call from a subscriber to receive the called ID information required to display both the caller's identity and a valid call back number, regardless of where the caller is calling from. In the exemplary embodiment, the long distance service is provided by the same local exchange carrier that operates the AIN 105.

To implement this service, the calling card company employs a toll switch (SSP 115a) to receive calls from its subscribers. Is this case, the SSP 115a is not connected to any individual subscriber lines or terminating equipment. An SCP 170 houses the calling card caller ID application and the calling card subscriber database 180. The calling card subscriber database includes the subscriber's calling card number, personal identification number, and the calling number data and calling name data that the subscriber would like to be sent to the called party's terminating equipment. Advantageously, the calling number data may represent a subscriber's portable number instead of a fixed residential or business phone. The toll switch 115a is connected to SCN 175, which is used primarily to provide instructions to the subscriber through voice prompts and to collect digits representative of the subscriber's calling card number and the directory number of the called party. The SCN 175 and SCP 170 are connected to each other and to the other AIN components in a conventional fashion.

Figure 2:
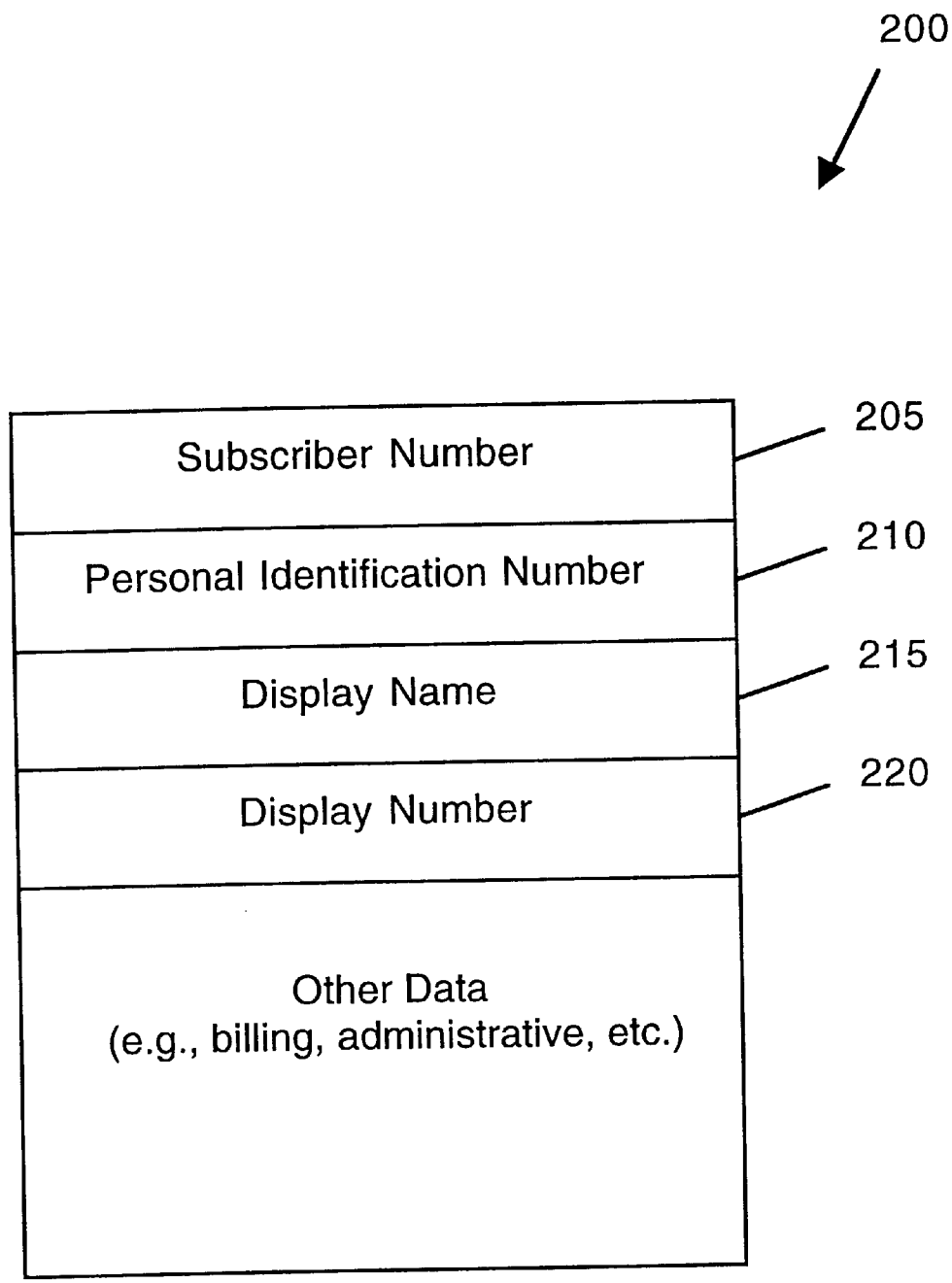
FIG. 2 is a diagram illustrating an exemplary database record from a calling card subscriber database.

FIG. 2 illustrates the relevant fields of an exemplary database record 200 from the calling card subscriber database, which is stored at SCP 170. For each subscriber, the database includes a subscriber number 205, such as the subscriber's account number or calling card number, and personal identification number 210, which is used for validation purposes. The database also includes calling name data (display name 215) and calling number data (display number 220). The display number 220 will be sent from the calling card company's toll switch to the terminating switch as the calling line data. The display name 215 is the name that will eventually be sent to the terminating switch as the calling name data after it launches its calling name query. Those skilled in the art will appreciate that the database may also include additional information for billing and administrative purposes.

Figure 3:
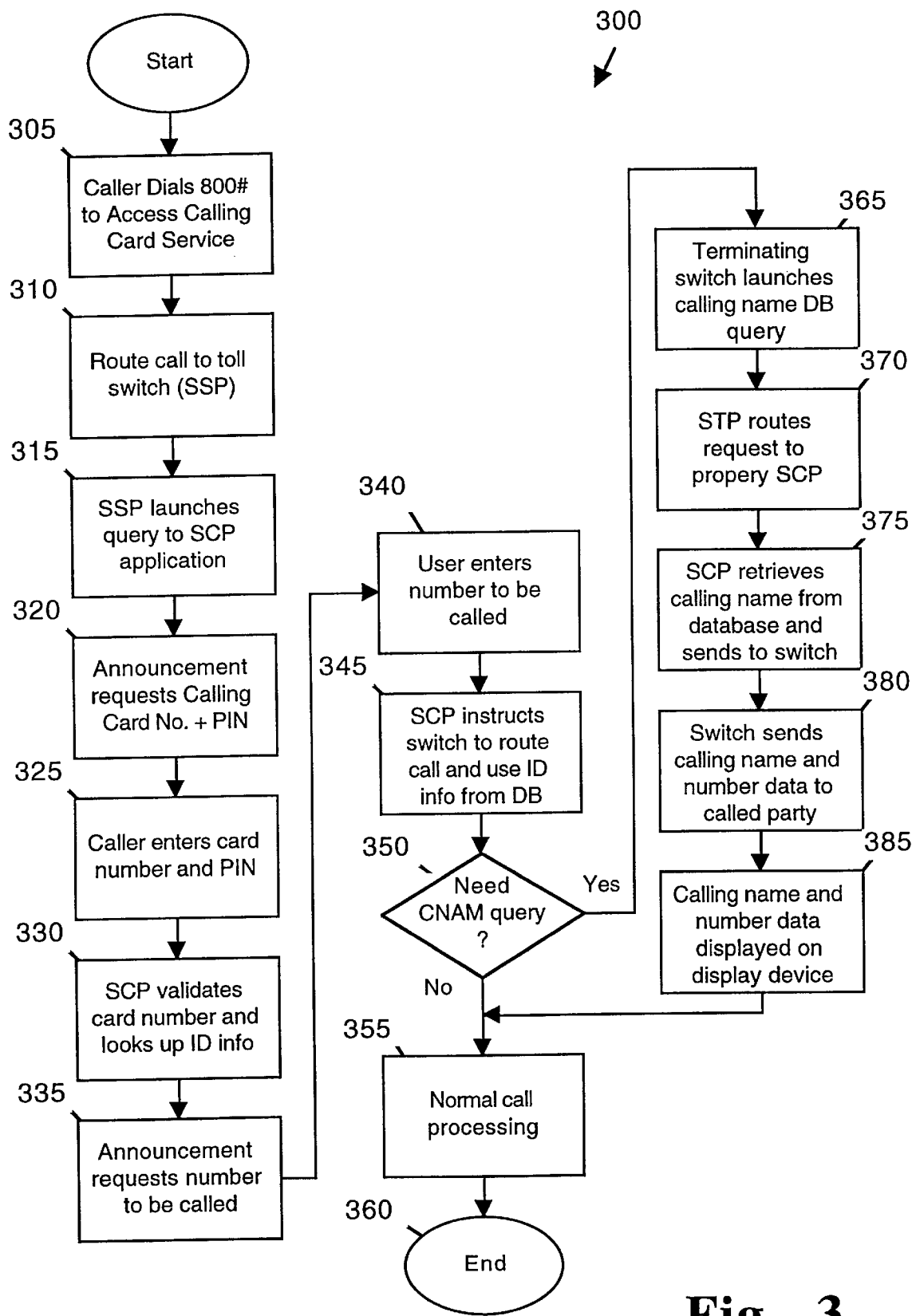
FIG. 3 is flow chart illustrating an exemplary method of providing caller identification in conjunction with calling card calls.

FIG. 3 is a flow chart illustrating an exemplary method 300 for implementing a calling card caller ID service in accordance with the present invention. It will be appreciated that the flow chart is FIG. 3 represents steps carried out by the caller, the PSTN, and various parts of the AIN.

At step 305 a long distance service subscriber initiates a calling card call by calling a directory number associated with the long distance service provider. Typically, this number is a toll free 800 number. For purposes of this illustration, the call may originate from terminating equipment 110 (FIG. 1) connected to the PSTN 100.

At step 310 the call is routed to a toll switch 115a (FIG. 1), which is operated by the long distance service company. In an exemplary embodiment, the toll switch is an SSP that forms a part of the AIN 105.

At step 315 the toll switch 115a (FIG. 1) connects the calling card caller to the SCN 175 (FIG. 1), which plays a message instructing the caller to enter his or her calling card number and PIN.

At step 320 the SCN 175 plays a message instructing the caller to enter his or her calling card number and PIN. The caller responds by entering the calling card number and PIN at step 325. The SCN collects the entered digits and transmits them to the SCP 170. At step 330 the SCP validates the calling card number and PIN and looks up the display number 220 (FIG. 2) in the database record associated with that calling card number.

It will be appreciated that the telecommunications company may allow the subscriber to select one of a group of predetermined display names to be transmitted during each call. In this scenario, the subscriber could provide a plurality of phone numbers (e.g., office and mobile), and select the desired display number at the beginning of each call. For example, the SCN may play a recording that instructs the subscriber to enter a "1" to select the office number and a "2" to select the mobile number as the display number.

At step 335 the SCN plays an announcement instructing the caller to enter the directory number to be called. The caller enters the called number at step 340 and the SCN transmits the number to the SCP. At step 345 the SCP instructs the switch 115a to route the call to the called number and to use the display number from the calling card subscriber database as the calling line identification data that will is transmitted to the terminating switch.

At step 350 the terminating switch 115b (FIG. 1) receives the call from the toll switch 115a and determines whether the called party has subscribed to the calling name, or Caller ID-Deluxe, service. If not, the operation proceeds to step 355 and process the call in a normal manner. The operation subsequently terminates at step 360. If the terminating switch needs to launch a calling name query, the operation proceeds to step 365.

At step 365 the terminating switch 115b launches a calling name query using the calling number that was received from the toll switch in the called party address portion of the query. At step 370 the STP 135 (FIG. 1) performs a global title translation on the data in the Called Party Address field and routes the query to the SCP that contains the calling name data associated with the calling card subscriber. Those skilled in the art will appreciate that the query may be routed to the SCP 170 (FIG. 1). Alternatively, the required data from the calling card subscriber's database may be stored in a database on other SCPs, such as the local SCP 30, or the regional SCP 150. This routing operation is described more completely below.

At step 375 the SCP retrieves the display name 215 (FIG. 2) from the database and transmits the calling name data to the terminating switch 115b. At that point (step 380), the call is completed and the calling name data, calling number data, date, and time are sent to the caller ID display device 120 in a conventional manner. The calling name data, calling number data, date, and time are displayed on the display device at step 385. At that point, the call is processed normally (step 355) and the operation subsequently terminates at step 360.

Routing the Calling Name Query and the Format of the Calling Name Database

Figure 4:
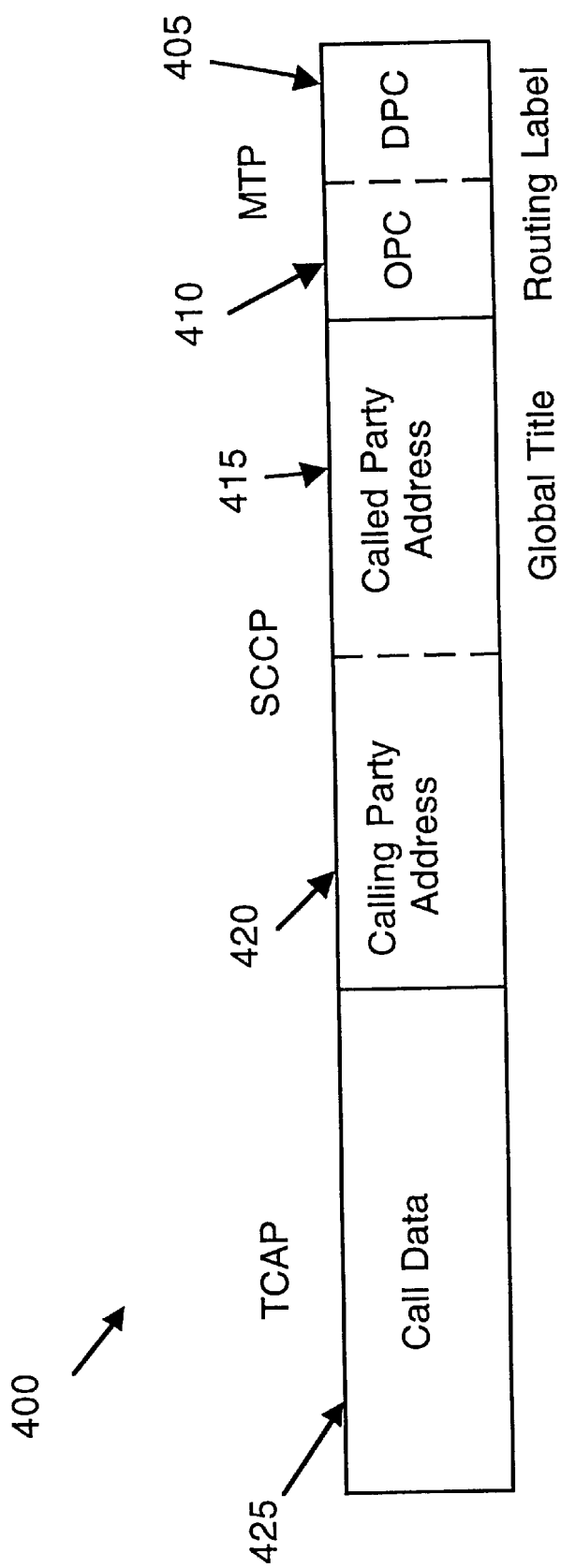
FIG. 4 is a diagram illustrating a typical AIN query message that is routed to the SCP that includes the calling card caller ID database.

When the terminating SSP determines that the called party subscribes to the calling name delivery service, it launches an AIN query to obtain the calling name that should be displayed on the called party's display device. FIG. 4 illustrates a typical AIN query message 400.

Typically, the SSP populates the routing parameters with the expectation that the STP will determine how to route the message and will reformat the message with the final routing information. In the case of most AIN queries, the SSP populates the routing parameters as follows. The destination point code (DPC) 405 includes the capability code of the local STP pair, and the origin point code (OPC) 410 includes the point code of the SSP that is originating the AIN query. The called party address 415 includes subsystem number (SSN) and a global title, which is the 10-digit called number. The calling party address 420 includes a SSN and the point code of the SSP that is originating the AIN query. For database services, the call data 425 includes Transaction Capability Application Part (TCAP) data, which includes a transaction ID, a trigger type, and a service key. The transaction ID is assigned a unique value for each call. The trigger type identifies the trigger type that was detected by the SSP. The service key is set to the 10-digit dialed number. It will be appreciated that the global title includes the called number because most AIN services are provided to the party that is receiving the call, not the calling party. Therefore, the query must be directed to a database that contains information about the services that are provided to the called party.

When the AIN query message is received by an STP, the STP performs a Global Title Translation on the global title (i.e., the called party address), changes the message parameters as follows, and launches the message. The STP changes the destination point code 405 to the point code of the appropriate SCP. In the called party address 415, the SSN data is changed to the SSN of the appropriate AIN Service Package Application (SPA).

When an SCP responds to the AIN query, the SCP will reformat the message as follows. The routing label will contain the destination point code of the SSP and the origin point code of the SCP. The called party address will contain the SSN of the SSP, and the calling party address will contain the SSN of the SCP. This information will allow the response message to get to the right subsystem in the right SSP.

In the case of a typical calling name query, the standard AIN query message format described above is altered by using the calling number as the global title. This allows an STP to translate the global title and route the query to a database containing information about the calling party (e.g., a calling name database). Those skilled in the art will appreciate that the global title field of an AIN query is limited to 10 digits and that the global title translation is usually based on the first six digits (commonly referred to as the NPA-NXX). Although the global title field is limited to 10 digits, the calling number data sent by the originating switch can include up to 15 digits.

In a standard calling name database, each customer record includes two fields: an ICLID field and a calling name (CNAM) field. When a calling name query is received by an SCP, it executes a calling name SPA and retrieves from the calling name database the calling name associated with the ICLID. The calling name data is then returned to the SSP that launched the query.

It will be appreciated that a calling card calling name database may be organized in a variety of ways. Exemplary methods are discussed below.

In one embodiment, the calling card calling name data may be added to a standard calling name database using linked records. This approach results in a two-pass calling name inquiry, and is most feasible when the calling card database and the calling name database are controlled by the same entity. In this embodiment, the modified calling name database includes both standard records and linked records. Each of the standard records includes an ICLID and associated caller name. As mentioned earlier, these records are typically derived from billing records for residential and business customers. The linked records are used to link a calling card subscribers calling name data to a standard record that is associated with the subscriber and includes the subscriber's name, as shown below:

|  | ICLID | CNAM |
|---|---|---|
| Standard record | 5552345678 | Bob Smith |
|  | . . . |  |
|  | . . . |  |
| Linked record | 5559876543 | *5552345678* |

In this example, both records are for Bob Smith. The standard record includes Bob Smith's name and uses his residential or business number as the ICLID. In the linked record, the ICLID is the calling number data Bob Smith has indicated he wants to be displayed when he makes a calling card call. In the linked record, the CNAM field includes special characters and a "key" that links the record to Bob Smith's standard record. In this example, the key corresponds to the ICLID associated with Bob Smith's standard record (5552345678) and the special characters include an asterisk (*). In this format, one special character precedes the key and one special character follows the key. When an SCP retrieves CNAM data that is preceded by a special character, the SCP can initiate a query of the standard record with ICLID data that corresponds to the key (i.e., the directory number) that is included in the CNAM data retrieved from the linked record. This will result in the retrieval of the CNAM "Bob Smith" from the standard record.

In an alternative embodiment, a two-pass calling name inquiry is used with two or more databases. This embodiment employs a calling card calling name database with linked records (for the first pass) and one or more separate calling name databases (for the second pass). Those skilled in the art will appreciate that this approach may be suitable for a regional service provider that maintains separate calling name databases for each state in the region.

If this embodiment is employed with calling card customers that want to display similar calling numbers, such as personal 800 numbers, the service provider may employ a single database that includes the linked records for its subscribers' 800 numbers. This 800 number database contains linked records that link that 800 number to the subscriber's standard telephone number.

In order to improve the efficiency of the CNAM lookup operation, it is useful to also include a database identifier, such as a calling name database identification number, in the CNAM field of the linked records. In one embodiment, the database identifier is a two-digit calling name database ID number that identifies the calling name database that includes the customer's record. An example of a modified linked record is shown below, where the calling name database ID number is represented by the digits "xx":

|  | ICLID | CNAM |
|---|---|---|
| LINKED DATABASE |  |  |
| Linked record | 8005552468 | *4045551357*xx |
| STANDARD CNAM DATABASE |  |  |
| Standard record | 4045551357 | Jim Brown |

In this example, the initial calling name query is routed to the linked database. When the SCP looks up the CNAM data associated with the linked record's ICLID number, it retrieves "*4045551357*xx". Upon detecting the leading special character (*), the SCP will read the calling name database ID number (xx) and refer to a table that provides the destination point code (DPC) of the calling name database that is identified by the retrieved database ID number "xx". A query will then be routed to the database "xx" to look up the calling name associated with the key that was included in the linked record's CNAM field. When this query is received by the CNAM database xx, the CNAM database will use the calling line identification number (e.g., 4045551357) to retrieve Jim Brown's name from a standard CNAM field. The SCP then returns the name "Jim Brown" to the SSP that launched the initial calling name query.

Those skilled in the art will appreciate that including a calling name database ID number in the linked record allows the SCP to perform a type of global title mapping and route the query to the proper DPC. This allows the SCP to avoid launching a query that would need to be translated by an STP.

In these and other scenarios, those skilled in the art will appreciate an SMS can be used to update the calling name database's linked records with data from the calling name database. Those skilled in the art will also appreciate that using linked records may facilitate some aspects of database management.

In another exemplary embodiment, the service provider maintains a separate calling card calling name database for its subscribers. Calling name queries are routed to this special database by using non-standard numbers in the global title field of the AIN queries. This approach requires the insertion of special numbers or characters, and is ideally suited for use with calling numbers that employ the prefix "1". For example, a user may want to display an 800 number, such as "1 800 555 3579", as a valid callback number.

In this example, the toll switch sends "1 800 555 3579" as the ICLID. When the terminating switch launches its calling name query, it places the first 10 digits (i.e., "1 800 555 357") in the global title field of the query. An STP performs a global title translation and routes the query to the SCP with the calling card calling name database. The SCP looks up the CNAM associated with the ICLID "1 800 555 357" and returns the CNAM to the SSP that launched the initial calling name query.

Although this provides a suitable mechanism for routing a query to the proper SCP, those skilled in the art will appreciate that truncating the last digit of the directory number limits the number of directory numbers that can be serviced by the database. In fact, the number of directory numbers available to a service provider's calling card caller identification service is reduced by one order of magnitude. So, for example, once a subscriber uses the directory number "800 555 1110", the directory numbers 800 555 111x, where x is a digit from 1 to 9, are precluded from being used as ICLID data in the calling card calling name database. Although this implementation provides a cost reduced calling card caller ID system, it requires the service provider to carefully manage the process by which numbers are assigned to subscribers. In this case, the available numbers could be reserved for "premium" customers.

As an alternative to using a "1" as the leading, special character, the service provider may elect to use any non-standard number that is not a valid callback number in order to ensure that the desired name is displayed. However, because the ICLID will be displayed on the called party's caller ID display device, the chosen non-standard numbers should be numbers that the called party will not try to call back. For example, a number like "002 555 1357" can be used to route a query to a calling name database, and is a number that most people will not try to call back.

Alternative Embodiments

In the embodiment of FIG. 1, the calling card subscriber database 180 is located at SCP 170. As mentioned above, in one embodiment, the calling name query from the terminating switch will be directed to the SCP 170 and the calling name data will be retrieved from the calling card subscriber database 180. Those skilled in the art will appreciate that the calling card calling name database, from which the calling name data is retrieved, may be a separate database and may be located at other SCPs. For example, the relevant data from the calling card subscriber database may be copied a separate calling card calling name database that is maintained on another SCP. Alternatively, the relevant data from the calling card subscriber database may transferred to an existing database at another SCP. For example, the necessary data from the calling card subscriber database may be appended to one or more regular calling name databases, such as those that are maintained and employed in conventional calling name delivery services. In either case, the SMS 155 (FIG. 1) may be employed to transfer data from the subscriber records in the calling name database 180 to databases at other SCPs in the AIN 105, such as local SCP 140 or regional SCP 152.

In the embodiment of FIG. 1, all of the calling card calls are routed to the toll switch 115a, which launches a query to obtain the proper calling number data from the subscriber's account records. Those skilled in the art will appreciate that routing calls to the toll switch can be avoided if the calling card call is placed from a switch in the AIN and if the originating switch is programmed to launch a calling card query in response to the calling card 800 number being dialed. At that point, an SCP would retrieve the calling number data and instruct the originating switch to route the call to the appropriate terminating switch and to send the retrieved calling number data as the calling number.

Conclusion

From the foregoing description, it will be appreciated that the present invention provides an improved system and method for providing calling party identification information to a called party in an intelligent network. In an exemplary system, a service provider, such as a long distance calling card company, maintains a subscriber database that includes preferred calling number data and calling name data for each subscriber. When a subscriber places a call, the service provider looks up the subscriber's database record and sends the calling number data to the terminating end office in place of normal calling number data. When the terminating end office launches a calling name inquiry, the inquiry will be directed to a database that includes the data from the service provider's subscriber database. The caller's name is returned to the terminating end office and displayed on the called party's display device, along with the calling number data, date, and time. By directing the calling name inquiry to the service provider's subscriber database, or to a database that includes relevant data from the subscriber database, the called party's caller ID display device is able to display both the calling party's identity and a valid call back number.

The present invention allows a caller to let the called party know both who the caller is and how to reach the caller, regardless of where the caller is calling from. It is believed that a service embodying the invention will be especially attractive to travelers and other business people who rely on "portable" numbers, such as personal numbers, or portable devices, such as cellular telephones, pagers, and the like, to receive calls regardless of where they are located. In this context, a caller will be properly identified and the preferred call back number will be displayed on the called party's caller ID display device. In another context, a service embodying the present invention will allow a traveling family members to be properly identified when they place a call back to their home.

A system in accordance with the present invention accomplishes two objectives. In a first aspect, such a system includes a subscriber database that provides the calling number data that is sent to the terminating switch and displayed on the called party's display device. This allows the subscriber to select a preferred calling number that will be transmitted with his or her calls. Preferably, this number is a portable number, but may be the subscriber's home number, work number, etc. The second aspect of the system includes adding new entries to a calling name database in order to match a name to non-traditional telephone numbers, thereby allowing the caller to be properly identified on the called party's display device.

Although the present invention has been described in an embodiment that provides caller identification data in conjunction with calling card calls, those skilled in the art will recognize that the present invention may be employed in other contexts. For example, a provider of business telephone services may employ the invention to replace a business's outgoing trunk line numbers with the business's inbound directory number and to display the business's name.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. In a telecommunications network, a method for providing calling party identification information to a called party, comprising the steps of:

receiving a first query from a first switch, the first query including a subscriber number;

in response to the first query, retrieving a calling line identification number associated with the subscriber number;

transmitting the calling line identification number to the first switch;

receiving a second query from a second switch, the second query including the calling line identification number;

in response to the second query, retrieving calling party identification information associated with the calling line identification number; and transmitting the calling party identification information to the second switch.

2. The method of claim 1, wherein retrieving calling party identification information associated with the calling line identification number comprises the steps of:

retrieving calling name data associated with the calling line identification number;

determining whether the calling name data includes a special character; and in response to the calling name data including a special character, retrieving the calling party identification information, the calling party identification information being associated with a key that forms a part of the calling name data.

3. The method of claim 2, wherein the calling name data and the calling party identification information are retrieved from a single database.

4. The method of claim 2, wherein the calling name data is retrieved from a first database, the calling party identification information is retrieved from a second database, and wherein the calling name data comprises a database identifier linking the calling name data to the second database.

5. The method of claim 1, wherein the calling line identification number comprises a non-standard number.

6. The method for claim 5, wherein retrieving calling party identification information associated with the calling line identification number comprises the steps of:

identifying a database record including the non-standard calling line identification number; and retrieving the calling party identification information from the database record.

7. The method of claim 1, wherein the subscriber number comprises a calling card number.

8. The method of claim 1, wherein the first switch is a toll switch.

9. In a telecommunications network, a computer-readable medium containing a data structure for allowing calling party information associated with a calling party to be displayed on a display device associated with a called party, the data structure comprising:

a linked record including a first field and a second field, the first field including a calling line identification number associated with the calling party, the second field including a special character and a key; and a standard record including a first field and a second field, the first field including a calling line identification number corresponding to the key, the second field including calling name data associated with the calling party, whereby the telecommunications network is able to provide to the display device both the calling line identification number associated with the calling party and the calling name data associated with the calling party.

10. The computer-readable medium of claim 9, wherein the linked record and the standard record are included in a single database.

11. The computer-readable medium of claim 9, wherein the linked record is included in a first database and the standard record is included a second database.

12. The computer-readable medium of claim 11, wherein the second field of the linked record further comprises a database identifier associating the linked record in the first database with the second database.

13. In an intelligent switched telecommunications network including an originating switch, a terminating switch, a service control point, a signal transfer point, and a data link functionally connecting the originating switch, the terminating switch, the service control point, and the signal transfer point, a method for providing calling party identification information to a called party, comprising the steps of:

receiving at the originating switch a telephone call to the called party, the telephone call including a subscriber number;

at the originating switch, launching a first query including the subscriber number;

receiving the first query at the service control point;

at the service control point, retrieving a calling line identification number associated with the subscriber number;

transmitting the calling line identification number to the originating switch;

at the originating switch, transmitting the calling line identification number to the terminating switch;

at the terminating switch, launching a second query including the calling line identification number;

receiving the second query at the service control point;

at the service control point, retrieving calling party identification information associated with the calling line identification number;

transmitting the calling party identification information to the terminating switch;

at the terminating switch, transmitting the calling line identification number and the calling party identification data to terminating equipment associated with the called party.

14. The method of claim 13, wherein retrieving calling party identification information associated with the calling line identification number comprises the steps of:

retrieving calling name data associated with the calling line identification number;

determining whether the calling name data includes a special character; and in response to the calling name data including a special character, retrieving the calling party identification information, the calling party identification information being associated with a key that forms a part of the calling name data.

15. The method of claim 14, wherein the calling name data and the calling party identification information are retrieved from a single database.

16. The method of claim 14, wherein the calling name data is retrieved from a first database, the calling party identification information is retrieved from a second database, and wherein the calling name data comprises a database identifier linking the calling name data to the second database.

17. The method of claim 13, wherein the calling line identification number comprises a non-standard number.

18. The method for claim 17, wherein retrieving calling party identification information associated with the calling line identification number comprises the steps of:

identifying a database record including the non-standard calling line identification number; and retrieving the calling party identification information from the database record.

19. The method of claim 13, wherein the subscriber number comprises a calling card number.

* * * * *